United States Patent
Helot et al.

(10) Patent No.: US 8,730,128 B2
(45) Date of Patent: May 20, 2014

(54) APPARATUS FOR DISPLAYING INFORMATION IN A MOTOR VEHICLE

(75) Inventors: Jacques Helot, Ingolstadt (DE); Wouter Kets, Ingolstadt (DE); Ulrich Beierlein, Ingolstadt (DE); Imanuel Merk, Rio de Janeiro (BR)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/637,923

(22) PCT Filed: Mar. 19, 2011

(86) PCT No.: PCT/EP2011/001350
§ 371 (c)(1),
(2), (4) Date: Dec. 10, 2012

(87) PCT Pub. No.: WO2011/120638
PCT Pub. Date: Oct. 6, 2011

(65) Prior Publication Data
US 2013/0088412 A1    Apr. 11, 2013

(30) Foreign Application Priority Data
Mar. 29, 2010   (DE) .......................... 10 2010 013 241

(51) Int. Cl.
*G09G 5/00* (2006.01)

(52) U.S. Cl.
USPC ............................... 345/7; 345/1.3; 359/630

(58) Field of Classification Search
CPC .............. G02B 27/0101; G02B 27/01; G02B 2027/0165; B60K 35/00; B60K 2350/2052; G01C 21/365; G09G 2300/026; G09G 2380/10
USPC .................. 345/1.1, 1.3, 3.1, 7, 8, 9; 359/630
See application file for complete search history.

(56) References Cited

U.S. PATENT DOCUMENTS

| 4,974,073 | A | * | 11/1990 | Inova .............................. 348/38 |
| 5,497,271 | A | * | 3/1996 | Mulvanny et al. ............ 359/631 |
| 6,100,943 | A | * | 8/2000 | Koide et al. .................... 349/11 |
| 6,690,337 | B1 | * | 2/2004 | Mayer et al. .................. 345/1.1 |

(Continued)

FOREIGN PATENT DOCUMENTS

| DE | 43 19 904 | 12/1994 |
| DE | 297 03 659 | 6/1997 |

(Continued)

OTHER PUBLICATIONS

International Search Report for PCT/EP2011/001350, mailed Jun. 22, 2011.

(Continued)

*Primary Examiner* — Koosha Sharifi-Tafreshi
(74) *Attorney, Agent, or Firm* — Staas & Halsey LLP

(57) ABSTRACT

An apparatus for displaying information in a motor vehicle, has a first display device which has a display area which is arranged in a dashboard of the motor vehicle. The apparatus also has a second display device for displaying the information on a windshield of the motor vehicle, which has a projection device. The second display device is arranged with respect to the first display device, and the two display devices are connected to a common control device, in such a way that coherent information, which continues from the first display device to the second display device, can be displayed on the two display devices.

5 Claims, 1 Drawing Sheet

(56) References Cited

U.S. PATENT DOCUMENTS

| | | | |
|---|---|---|---|
| 6,750,832 B1* | 6/2004 | Kleinschmidt | 345/7 |
| 7,453,418 B2* | 11/2008 | Palmquist | 345/1.1 |
| 2008/0211652 A1* | 9/2008 | Cope et al. | 340/461 |
| 2009/0009314 A1* | 1/2009 | Taniguchi et al. | 340/461 |
| 2011/0122049 A1* | 5/2011 | Lvovskiy et al. | 345/1.3 |
| 2012/0072103 A1* | 3/2012 | Backman | 701/400 |

FOREIGN PATENT DOCUMENTS

| | | |
|---|---|---|
| DE | 202 10 601 | 11/2003 |
| DE | 10 2004 007 802 | 9/2005 |
| DE | 10 2005 026 787 | 12/2006 |
| DE | 603 19 550 | 3/2009 |
| DE | 10 2007 053 421 | 5/2009 |
| DE | 10 2009 002 328 | 11/2009 |
| DE | 10 2010 013 241.1 | 3/2010 |
| EP | PCT/EP2011/001350 | 3/2011 |
| WO | 98/28649 | 7/1998 |
| WO | 2005/067315 | 7/2005 |

OTHER PUBLICATIONS

International Preliminary Report on Patentability for PCT/EP2011/001350, mailed Oct. 4, 2012, 7 pages.

* cited by examiner

_US 8,730,128 B2_

APPARATUS FOR DISPLAYING INFORMATION IN A MOTOR VEHICLE

CROSS REFERENCE TO RELATED APPLICATIONS

This application is based on and hereby claims priority to International Application No. PCT/EP2011/001350 filed on Mar. 19, 2011 and German Application No. 10 2010 013 241.1 filed on Mar. 29, 2010, the contents of which are hereby incorporated by reference.

BACKGROUND

The invention relates to an apparatus for displaying information in a motor vehicle.

An apparatus of the generic type for displaying information in a motor vehicle is known from DE 297 03 659 U1. A conventional display apparatus or a back-projection display is combined here with a head-up display in such a way that a combined display apparatus for displaying information is formed. Furthermore, both display devices can be actuated and used jointly as one unit.

Similar apparatuses are also known from WO 98/28649 A1 and DE 10 2004 007 802 A1.

DE 10 2007 053 421 A1 describes an antenna device for connecting to a computing device and a projection device for generating a virtual image.

A further display apparatus for a motor vehicle having an instrument panel, which comprises a total of three displays, is described in DE 10 2005 026 787 A1. The displays are arranged in such a way that the information areas which can be perceived visually by the viewer are added together to form a common, enlarged information area.

DE 603 19 550 T2 describes a projection and navigation system for a vehicle which has a video projector which is capable of transmitting video information onto a projection area.

WO 2005/067315 A1 discloses a method and an apparatus for displaying information in a motor vehicle using a laser projection display. Inter alia, a laser projection display is provided which is capable of displaying images on a windshield and/or a dashboard.

A device for displaying information in a vehicle is described in DE 202 10 601 U1. For this purpose, a projection screen, on which a projection unit acts, is provided in the region of the dashboard.

In general, a multiplicity of information items are displayed in what are referred to as head-up displays, that is to say on the one hand in apparatuses which project information onto the windshield, and, on the other hand, in what are referred to as combination instruments which are arranged in the dashboard. However, in all the solutions which have been known until now it has been difficult for the driver to spontaneously relate the information displayed in the combination instrument to that displayed on the head-up display, especially since various information items are frequently displayed doubly and separately. The head-up display has until now not been successfully integrated into the overall design of the motor vehicle.

SUMMARY

One potential object is therefore to provide an apparatus for displaying information in a motor vehicle, in which apparatus one display device displays information in a dashboard and a further display device displays information on a windshield, wherein the intention is that the displayed information will be more easily comprehensible and the display device will be easily readable by the driver.

The inventors propose an apparatus for displaying information in a motor vehicle, having a first display device which has a display area which is arranged in a dashboard of the motor vehicle, and having a second display device for displaying the information on a windshield of the motor vehicle, which has a projection device. The second display device is arranged with respect to the first display device, and the two display devices are connected to a common control device, in such a way that coherent information, which continues from the first display device to the second display device, can be displayed on the two display devices.

The proposed apparatus therefore provides an apparatus for displaying information which is composed of two display devices which are completely independent from one another in principle but which are combined to form an overall image, with the result that the information can be read and processed very much more easily by a user than is the case in known solutions when a plurality of display devices are combined with one another. With the proposed solution, the user does not have to jump between two display devices but can instead use the very steady, uniform design of the apparatus to absorb the information displayed on it.

A particular advantage of the solution is also that a display which is continuous in principle is obtained, on which display virtually any desired number of information items can be displayed in a freely positioned manner and in a common context.

A particularly good junction is provided between the two display devices by virtue of the fact that the first display device has a curved display area which changes from a substantially vertical orientation on the side facing away from the second display device, in the direction of the side facing the second display device, into a substantially horizontal orientation.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
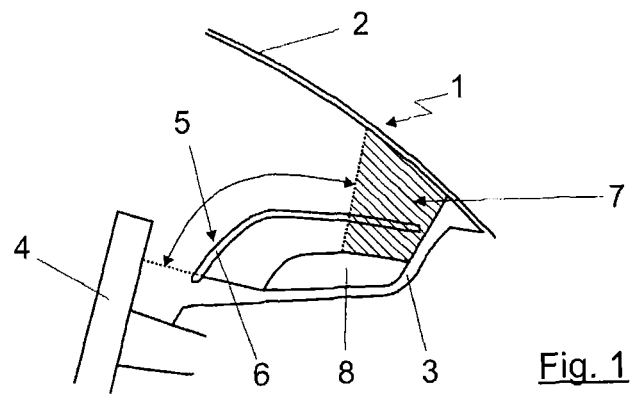
FIG. 1 shows a sectional illustration of a first embodiment of one potential embodiment of the proposed apparatus.

Reference will now be made in detail to the preferred embodiments of the present invention, examples of which are illustrated in the accompanying drawings, wherein like reference numerals refer to like elements throughout.

FIG. 1 shows an apparatus 1 for displaying information in a motor vehicle (not illustrated in its entirety). In addition to the apparatus 1, a windshield 2, a dashboard 3 and a steering wheel 4 of the motor vehicle are illustrated. The apparatus 1 has a first display device 5 which has a display area 6 which is arranged in the dashboard 3 of the motor vehicle. Furthermore, the apparatus 1 has a second display device 7, which has a projection device 8 by which information can be displayed on the windshield 2 of the motor vehicle. While the first display device 5 can be referred to as a combination instrument, the second display device 7 is usually referred to as a head-up display. Of course, the image which is displayed on the windshield 2 can, as in the case of known head-up displays, focus at some distance in front of the motor vehicle, where it is located in the field of vision of a driver of the motor vehicle.

In the embodiment of the apparatus 1 according to FIG. 1, the projection device 8 is also provided for displaying information on the display area 6 of the first display device 5 or projecting it onto the display area 6, with the result that in this embodiment the projection device 8 can also be considered part of the first display device 5. In this context, the projection device 8 can be divided into two sections, one section of which supplies the first display device 5, in order to display information on the display area 6, and the second section supplies the second display device 7, in order to display the information on the windshield 2.

Figure 2:
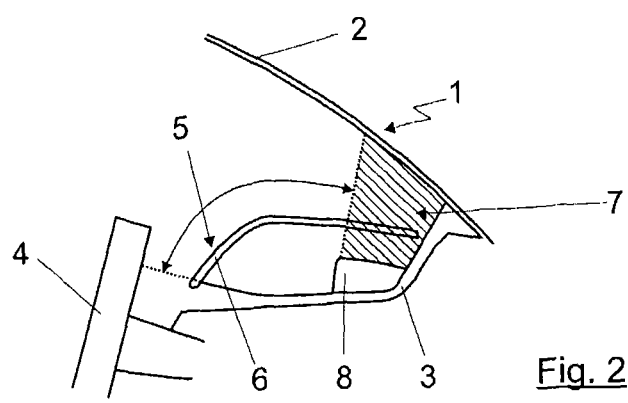
FIG. 2 shows a sectional illustration of a second potential embodiment of the proposed apparatus.

In contrast, in the embodiment according to FIG. 2, the projection device 8 is provided only for the second display device 7 for projecting information on the windshield 2, whereas the display device 6 of the first display device 5 is embodied as an image-generating display area, i.e. a display area which generates an image itself without a projection device or a similar device. In this embodiment of the display area 6, it is therefore possible to provide, for example, an LED display, LCD display, plasma display or an image-generating display which is formed in some other way.

The two embodiments according to FIG. 1 and FIG. 2 have in common the fact that the display area 6 of the first display device 5 is curved and changes from a substantially vertical orientation on the side facing away from the second display device 7, that is to say on the side facing the steering wheel 4 in the illustrated embodiment, in the direction of the side facing the second display device 7, that is to say on the side facing the windshield 2 in the illustrated exemplary embodiment, into a substantially horizontal orientation. The embodiment of the curved display area 6 is possible both for the case in which it is an image-generating display and also for the case in which the projection device 8 projects onto the display area 6. Furthermore, a planar configuration of the display area 6 is also possible. The term "curved" also includes a display area 6 which has two substantially planar display areas connected by a radius.

Furthermore, FIGS. 1 and 2 show that the display area 6 of the first display device 5 continues in the region between the projection device 8 and the windshield 2. In order, nevertheless, to permit the projection device 8 to project information onto the windshield 2, it is advantageous if the display area 6 is embodied in a transparent or semi-transparent fashion in the region between the projection device 8 and the windshield 2. Alternatively, the display area 6 can also have an opening in this region between the projection device 8 and the windshield 2. The embodiment as a partially transparent display area 6 is to be preferred for design reasons since this embodiment eliminates a "hole" in the dashboard 3, which is present when there are head-up displays.

Figure 3:
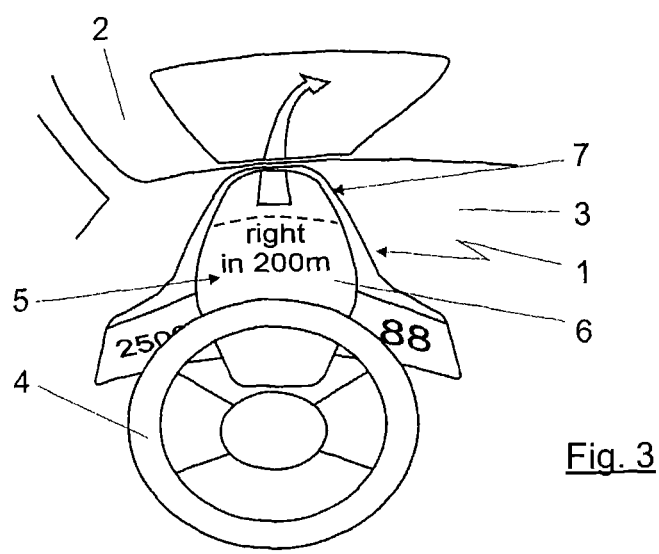
FIG. 3 shows a plan view of the apparatus according to FIG. 1 or FIG. 2.

In the illustration according to FIG. 3 it is apparent that the first display device 5 with the display area 6 is arranged with respect to the second display device 7 in such a way that coherent information, which continues from the first display device 5 to the second display device 7, is displayed on the two display devices 5, 7. For this purpose, the two display devices 5, 7 are connected to a common control device, which permits this continuous display. The control device which is necessary for this purpose is not illustrated in the figures, but for a person skilled in the art it can be discerned without difficulty. The control device can, of course, be used both in the embodiment illustrated in FIG. 1 as well as in that illustrated in FIG. 2, in order to actuate the components of the two display devices 5 and 7 in the desired way. Although in the case of the display area 6, on the one hand, and the windshield 2, on the other, there are still separate images, solely because of the configuration of the passenger compartment of the motor vehicle in this region, a seamless junction is actually present between the images.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. An apparatus to display information in a motor vehicle having a dashboard and a windshield, comprising:
    a first display device which has a display area arranged in the dashboard; and
    a second display device to display at least a portion of the information on the windshield, the second display device having a projection device,
    wherein the second display device is arranged with respect to the first display device, and the two display devices are connected to a common control device, in such a way that coherent information, which continues from the first display device to the second display device, is displayed on the two display devices,
    wherein the display area of the first display device curves toward the second display device, changing from a substantially vertical orientation on a side facing away from the second display device, into a substantially horizontal orientation on a side facing toward the second display device,
    wherein the first display device extends toward the windshield, crossing a plane extending from the windshield to the projection device of the second display device, and the display area of the first display device has an opening in a region between the projection device of the second display device and the windshield.

2. The apparatus according to claim 1, wherein the first display device uses a projection device to project at least a portion of the information onto the display area.

3. The apparatus according to claim 2, wherein the first display device uses the projection device of the second display device to project at least a portion of the information onto the display area.

4. The apparatus according to claim 1, wherein the display area of the first display device is an image-generating device.

5. The apparatus according to claim 1, wherein the display area of the first display device is an image-generating device selected from the group consisting of an LED display, a LCD display and a plasma display.

* * * * *